United States Patent [19]

Eastman et al.

[11] Patent Number: 5,784,348
[45] Date of Patent: Jul. 21, 1998

[54] PHASE DETECTED DIRECT READ DURING WRITE

[75] Inventors: Clarke K. Eastman, Rochester; Roger A. Hajjar; Edward C. Gage, both of Fairport; Steven C. Dohmeier, Rochester, all of N.Y.

[73] Assignee: Eastman Kodak Company, Rochester, N.Y.

[21] Appl. No.: 666,172

[22] Filed: Jun. 19, 1996

[51] Int. Cl.⁶ .................................................. G11B 7/00
[52] U.S. Cl. ............................................................ 369/54
[58] Field of Search ............................. 369/54, 120, 125, 369/116, 53, 124, 59, 48

[56] References Cited

U.S. PATENT DOCUMENTS

| | | | |
|---|---|---|---|
| 5,406,540 | 4/1995 | Longman et al. | 369/116 |
| 5,440,534 | 8/1995 | Eastman et al. | 369/54 |
| 5,446,716 | 8/1995 | Eastman et al. | 369/53 |
| 5,491,682 | 2/1996 | Dohmeier et al. | 369/116 |
| 5,495,466 | 2/1996 | Dohmeier et al. | 369/116 |
| 5,537,383 | 7/1996 | Gange et al. | 369/116 |
| 5,561,645 | 10/1996 | Eastman et al. | 369/44.29 |
| 5,629,921 | 5/1997 | Eastman et al. | 369/54 |

*Primary Examiner*—Nabil Hindi
*Attorney, Agent, or Firm*—James D. Leimbach

[57] ABSTRACT

An optical recording system for recording data on an optical medium comprising: an optical source capable of providing at least one write pulse incident upon the optical medium; a direct read during write (DRDW) verification and control system within the optical source having a capability of measuring light reflected from the optical medium into a return beam aperture, the DRDW system including a plurality of detectors configured to receive light from different areas of the return aperture; and a comparison circuit for comparing light received in different portions of the return aperture.

19 Claims, 11 Drawing Sheets

PHASE DETECTED DIRECT READ DURING WRITE

FIELD OF INVENTION

The invention relates generally to the field of optical recording, and in particular to Direct Read During Write (DRDW) techniques employed in optical recording.

BACKGROUND OF THE INVENTION

Figure 1:
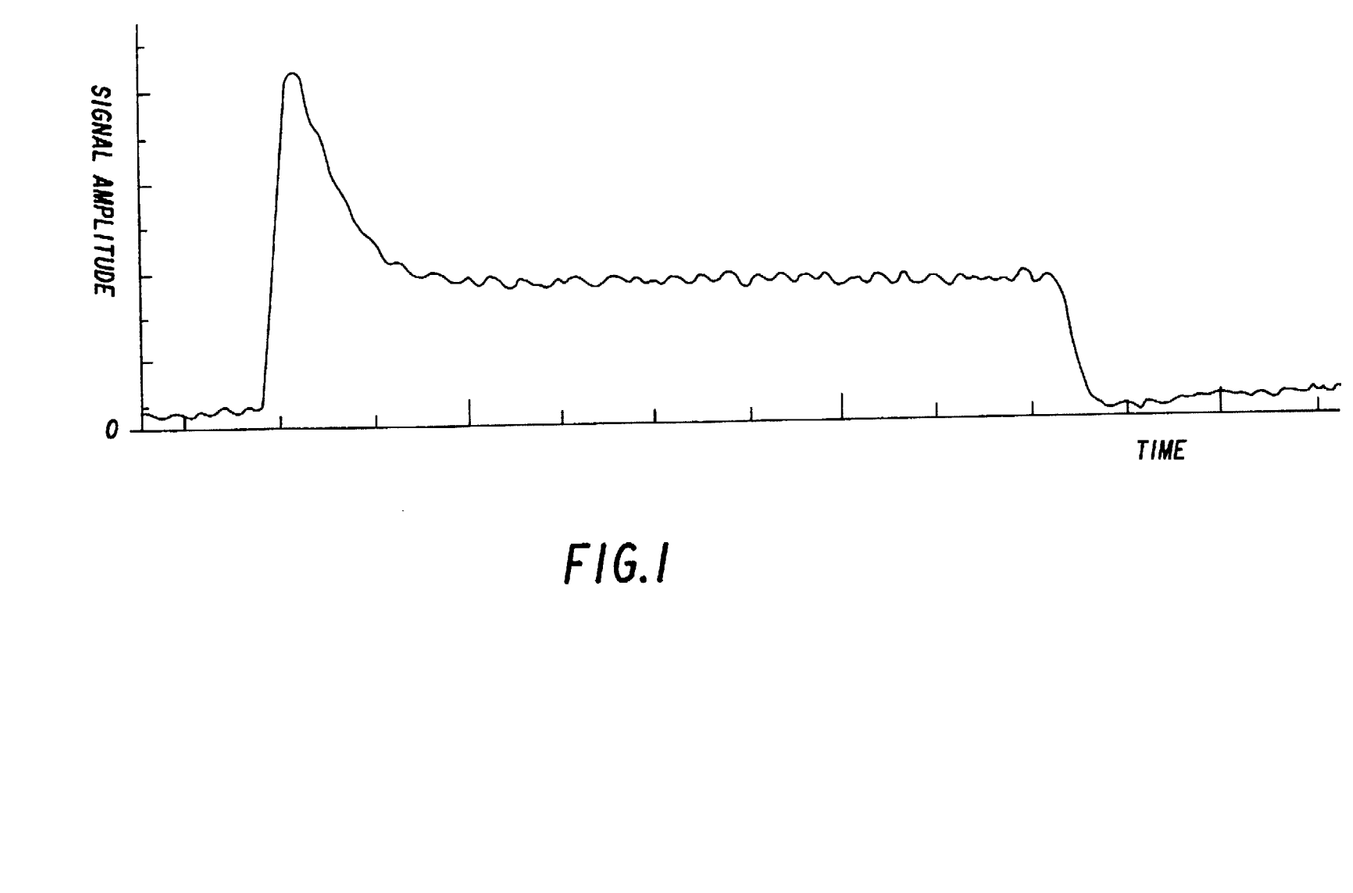
FIG. 1 shows a typical DRDW signal of a dye-based writeable CD.

"Direct Read During Write" schemes make one or more measurements of reflected light during a write pulse, and use that (and other) information to decide whether or not correct mark formation is taking place. The determination of mark formation is used for write verification and to control the recording process. Mark formation is currently measured in various ways. A commonly described technique is to measure the total amount of reflected light twice during a write pulse; once before mark formation has occurred and again after mark formation has (or has not) begun. Such prior art devices are disclosed in U.S. Pat. No. 5,216,660 issued to Iimura et al. and U.S. Pat. No. 5,495,466 issued to Dohmeier et al. Variations on this theme include methods that estimate the first level based on incident laser power during a write pulse and media reflectivity between write pulses. There are also "Direct Read During Write" methods which measure reflected light at one or more times between write pulses. Such prior art devices are shown in U.S. Pat. No. 4,599,717 issued to Bracht et al. All these current schemes are based on the fact that written "marks" and unwritten "lands" have different reflectivities. These approaches work adequately for dye-based writeable CD media, where the reflectivity is typically substantially larger on the land areas than on the marks. FIG. 1 shows a typical DRDW waveform for dye-based writeable CD media where reflectivity changes by more than a factor of two during a write pulse.

Figure 2:
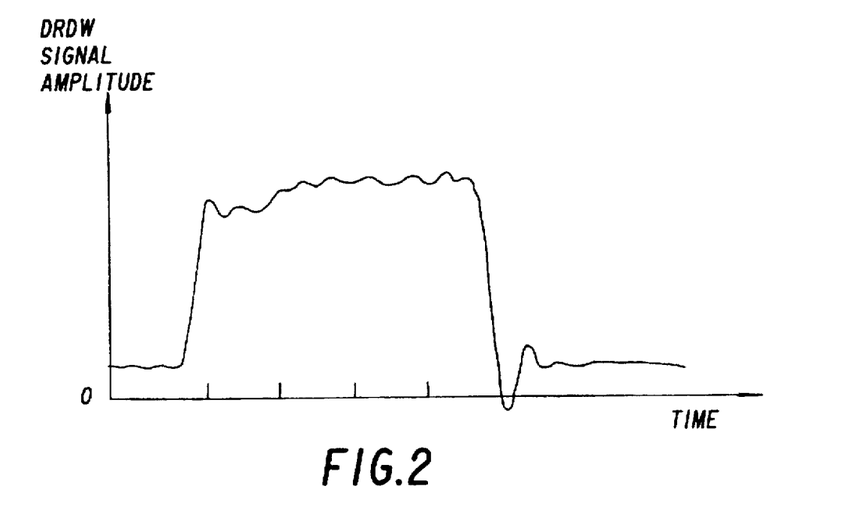
FIG. 2 illustrates a typical DRDW signal of a phase change media based disc.

For media like the "phase change" (PC) disks used in Kodak's 14" optical data storage product, there is a much smaller reflectivity difference between mark and land. Although difficult to measure (because it is so small), the reflectivity during a write pulse typically varies by less than 20% from its initial value as shown in FIG. 2. There are many barriers to accurately measuring such a small effect. For example, transient phenomena such as ringing in detection electronics or a long "tail" in a detector's response could easily mask it.

From the foregoing discussion, it is readily apparent that there remains a need within the art for a method and apparatus that can accurately determine the quality of marked being formed when writing on such media.

SUMMARY OF THE INVENTION

An optical recording system for recording data on an optical medium comprising: an optical source capable of providing at least one write pulse incident upon the optical medium; a direct read during write (DRDW) verification and control system within the optical source having a capability of measuring light reflected from the optical medium, the DRDW system including a plurality of detectors configured to receive light reflected from the optical medium, and received in different portions of the return aperture; and a comparison circuit for comparing the signals from different detectors. These and other aspects, objects, features and advantages of the present invention will be more clearly understood and appreciated from a review of the following detailed description of the preferred embodiments and appended claims, and by reference to the accompanying drawings.

Advantageous Effect Of The Invention

The present invention has several advantages. Phase detection has the potential to work effectively with phase change media where reflectivity differences are not nearly as substantial as with dye based optical media. One embodiment of the present invention allows DRDW signals to be measured later in a write pulse, after mark formation has taken place, allowing signal artifacts to settle. The phase detected DRDW approach also yields a mark formation signal that has improved robustness to laser pulse shape variations.

BRIEF DESCRIPTION OF THE DRAWINGS

FIG. 7b is an illustration of the corresponding DRDW signals from the front and back of the aperture for the two recording powers of FIG. 7a;

FIG. 8a illustrates the difference between the front and back aperture signals at the two recording powers of FIG. 7a;

To facilitate understanding, identical reference numerals have been used, where possible, to designate identical elements that are common to the figures.

DETAILED DESCRIPTION OF THE INVENTION

Figure 3:
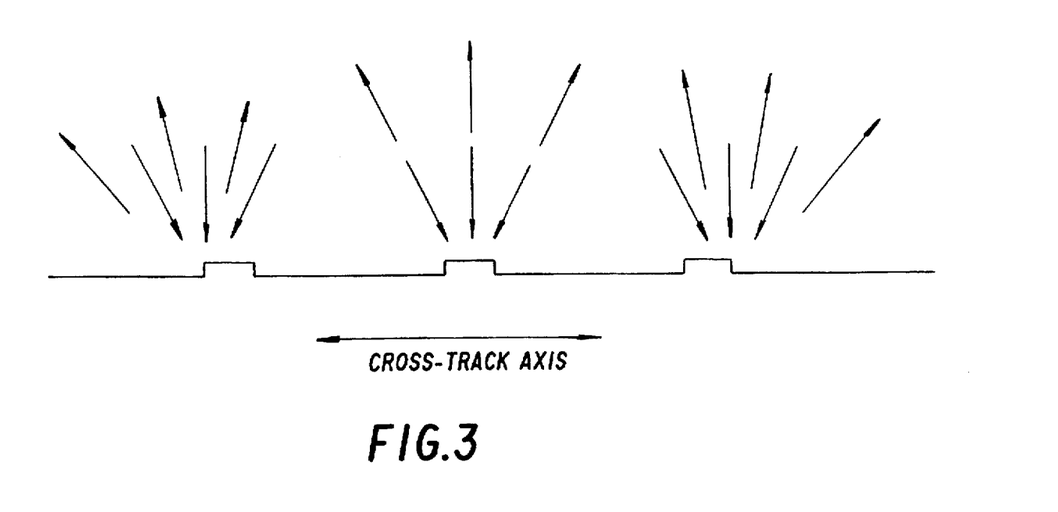
FIG. 3 is an illustration of the cross-track "push/pull" effect.

It has been discovered that a fundamentally different approach to Direct Read During Write (DRDW) can be employed in optical recording to use the fact that light reflected by marks often has a different phase from light reflected by lands. The phase difference between mark-reflected and land-reflected light causes a diffraction effect when the illuminating spot is partly on a mark and partly on a land. This effect is already used, for example, to generate phase tracking ("push-pull") signals for both phase change and writeable CD media. When the illuminated spot moves off-track, the reflected light diffraction pattern shifts in the cross-track direction. This is usually detected as a change in relative illumination at two or more sensors which receive light from different portions of the return aperture. For push-pull detection, the aperture is divided in the cross-track direction to measure cross-track diffraction. The push-pull effect is illustrated in FIG. 3.

Figure 4:
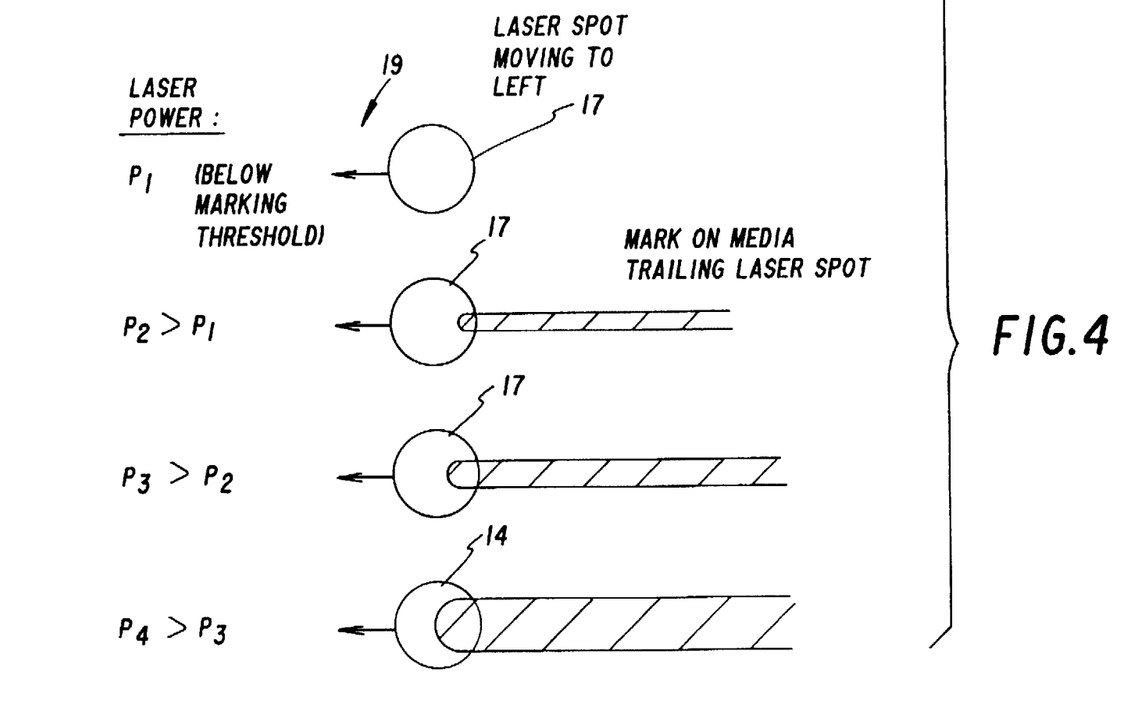
FIG. 4 illustrates mark formation beneath a laser spot at four different recording power levels.

FIG. 4 illustrates a laser spot 17 as it writes marks at four different recording powers. $P_1$, $P_2$, $P_3$, and $P_4$. $P_1$ is below the threshold for forming a mark. $P_2$ is above that marking threshold. $P_3$ is still a greater intensity than $P_2$ and $P_4$ is still of a greater intensity than $P_3$. As the laser spot intensity increases it will begin forming the mark sooner and result in longer marks. The current invention recognizes that there is in-track diffraction of the recording beam by the mark being formed beneath it. Phase detected DRDW consists of measuring this in-track diffraction pattern to detect marks as they are being written.

The in-track diffraction pattern before or at the start of a write pulse is different from the in-track diffraction pattern later in the write pulse, when mark formation is occurring. The diffraction pattern also changes with the degree of mark formation, and is, therefore, useful in laser power control as well as write verification.

Figure 5:
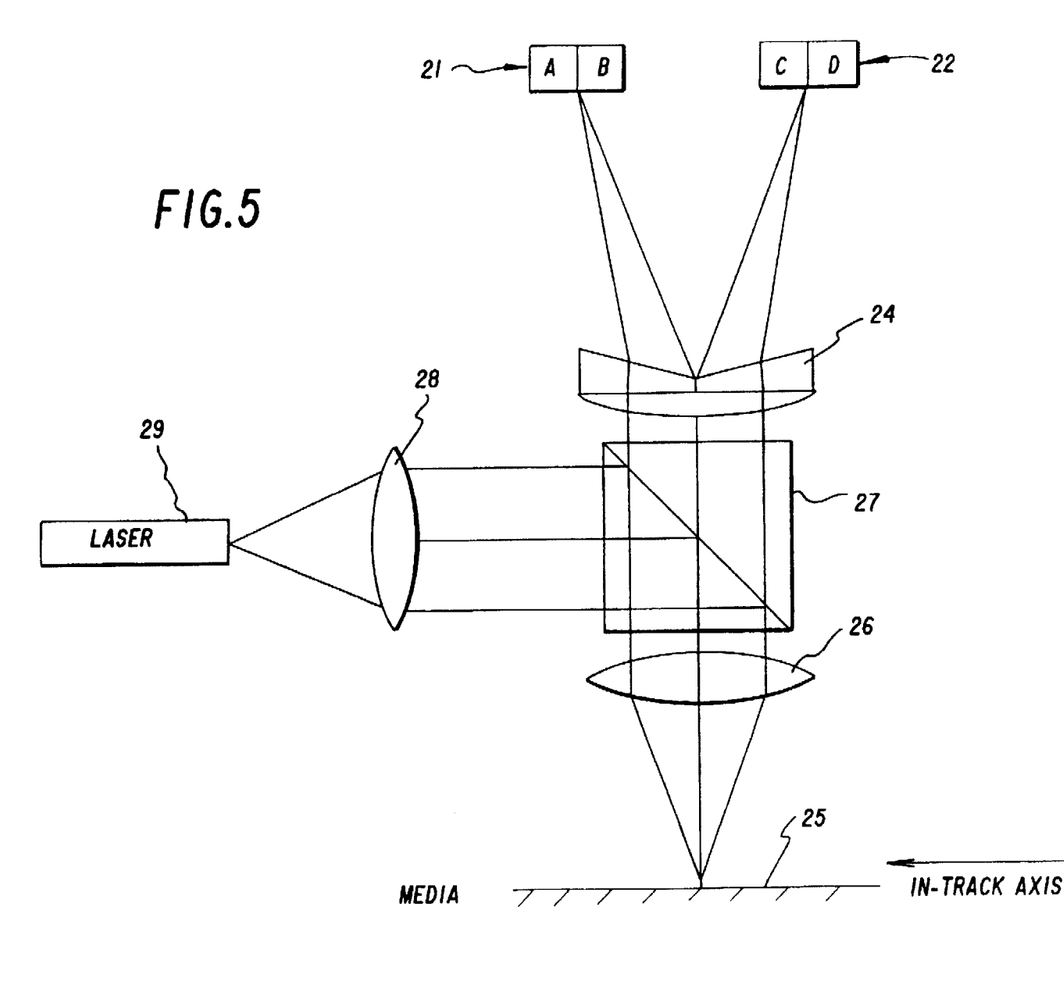
FIG. 5 shows the example of "Dual Half Aperture" focus detection.

Just as the push/pull tracking signal is detected by dividing the aperture in the cross-track direction, dividing the aperture in the in-track direction can be used to generate a phase detected DRDW signal. A similar diffraction effect has also been previously employed to generate a read back signal by dividing the aperture in the in-track direction to measure in-track diffraction by previously formed marks. For many optical recording heads, the detectors are already in place to do this. Referring to FIG. 5, shows an example of "Dual Half Aperture" focus detection. Light from laser 29 focuses through lens 28, optics 27 and lens 26 to become incident upon optical medium 25. Light reflected from optical medium 25 returns through lens 26 and optics 27 through objective lens 24 to forward detectors 21 and rear detectors 22. In FIG. 5, the scheme shown has one pair of forward detectors 21 to measure light received in the forward half of the objective lens 24. The other pair detectors 22, measures light received in the rear half of the objective lens 24. The phase detected DRDW signal would compare the summed signal from detector pair 21 with the summed signal from detector pair 22.

Figure 6A:
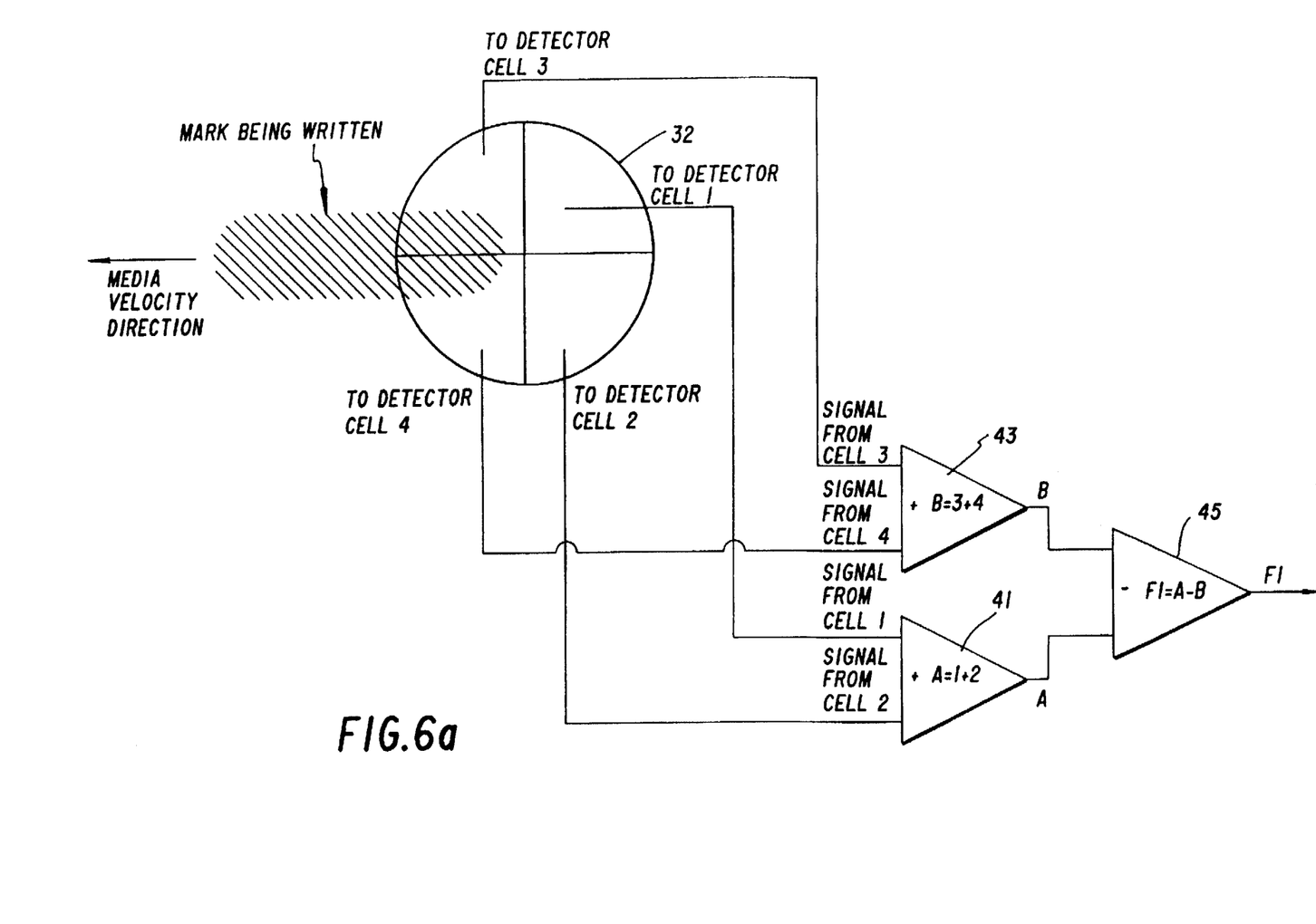
FIG. 6a shows one detector and electronic configuration to produce a phase detected DRDW signal.

Another approach to measuring phase detected DRDW is shown in FIG. 6a. A multi-element detector such as the quad cell sensor 32 shown can be used to detect light received in the return aperture. With the quad cell, both in-track and cross-track diffraction patterns can be measured. Through similar reasoning a phase detected DRDW signal could be generated from any number of detector configurations using at least two sensors.

FIG. 6a shows electronics configured to produce a phase detected DRDW signal from the quad cell output signals. Electrical signals from forward detectors (1 and 2) correspond to light received into the front half of the return beam aperture and are summed by adder 41 to create a signal A. A similar combination of signals for rear detectors (3 and 4) are summed by adding circuit 43 to create signal B. Signals A and B are then sent to comparison circuit 45 to determine their difference, which is output as difference signal F1.

Figures 6B, 6C:
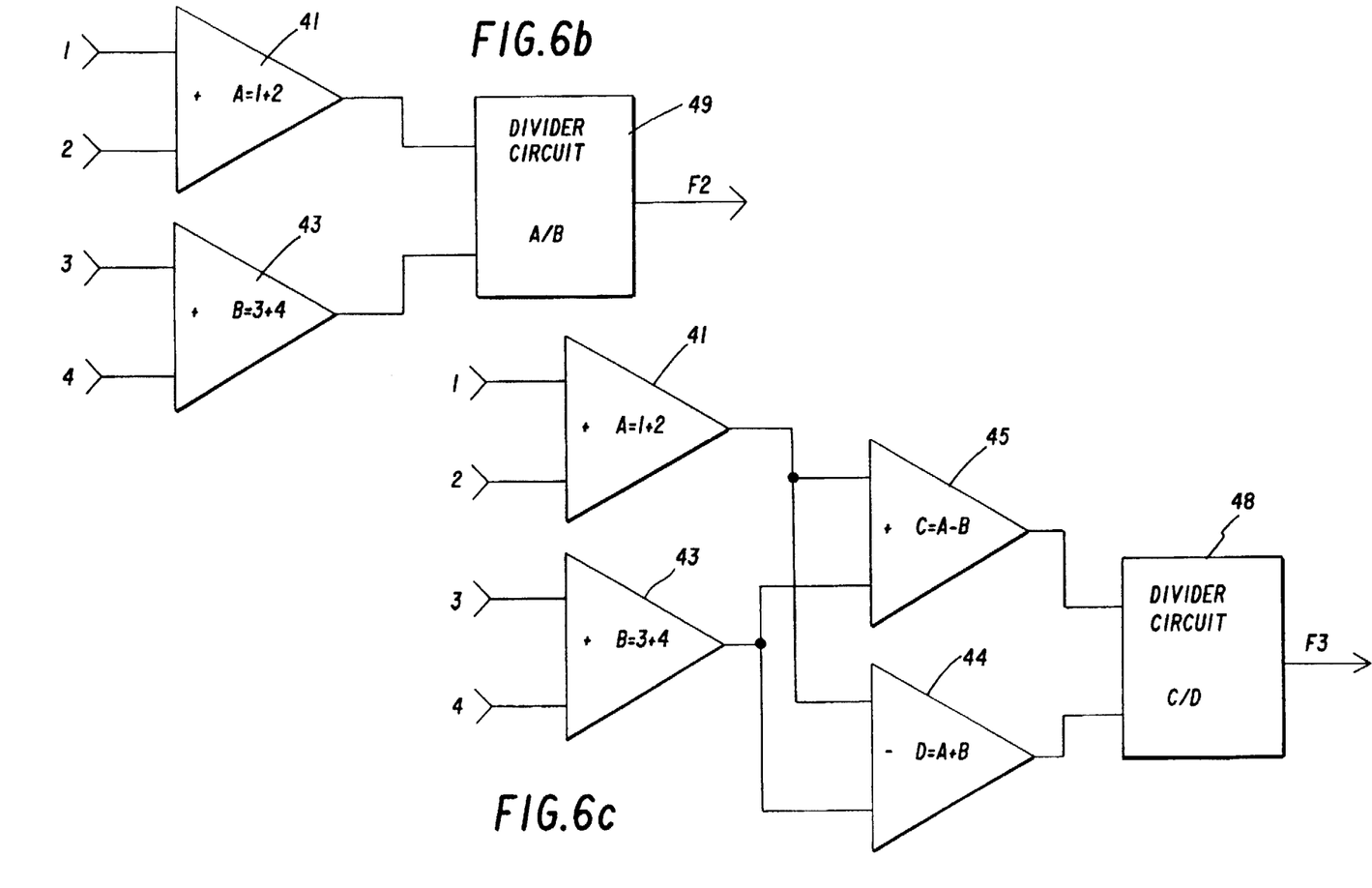
FIG. 6b shows a second electronic configuration to produce a phase detected DRDW signal.
FIG. 6c shows a third electronic configuration to produce a phase detected DRDW signal.

FIGS. 6b and 6c show other examples of signal processing to produce other phase detected DRDW signals as discussed below. The circuit of FIG. 6b illustrates the same forward 41 and rear 43 adder circuits having their outputs placed into a divider circuit 49. The output of the divider circuit, F2, then is used to arrive at the phase detected DRDW signal. FIG. 6c shows yet another method of arriving at the phase detected DRDW signal. The outputs from adder circuits (41, 43) are each placed into another adder 44 as well as a subtractor circuit 45. The outputs of adder 44 and subtractor 45 are then placed into divider circuit 48. The output, F3, of the divider circuit 48 is then used for the phase detected DRDW signal.

Experimental Results and Observations

Figure 7A:
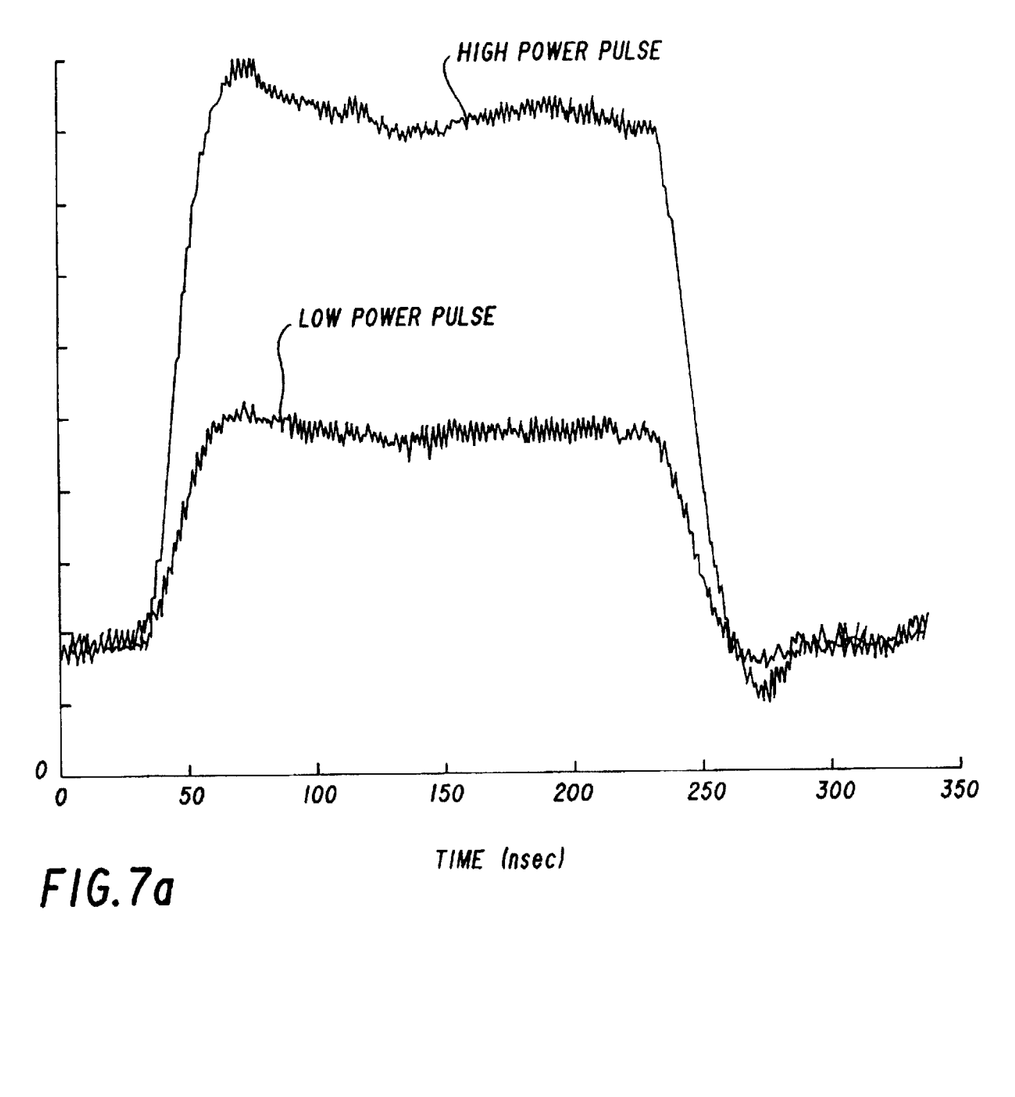
FIG. 7a is an illustration of the recording laser output vs. time at two recording powers.
Figure 7B:
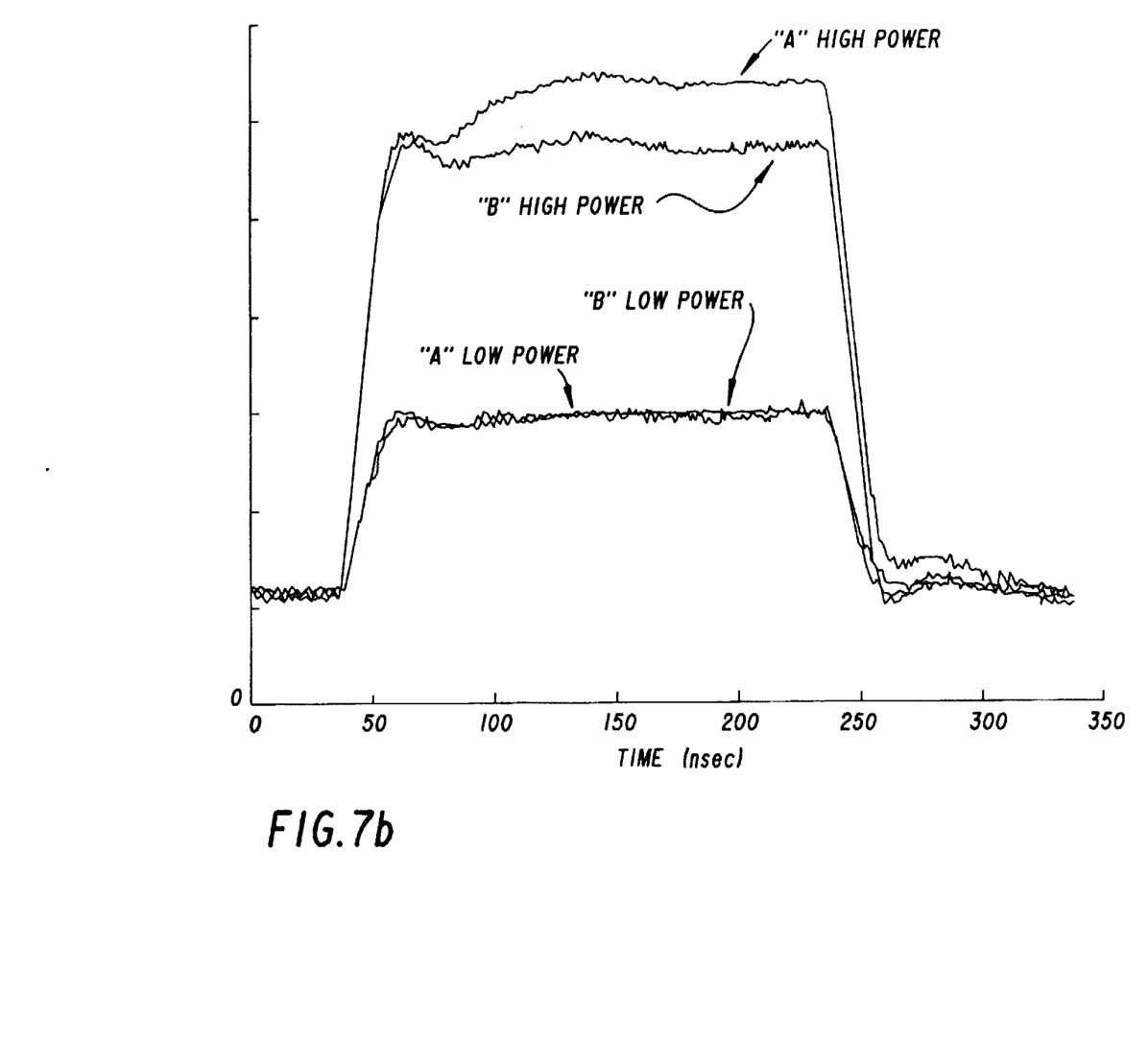

Using phase change (PC) media and the detection system of FIG. 6a, in-track diffraction components are collected during a write pulse. FIG. 7a displays the output of the recording laser vs. time at two different recording powers, as monitored by a Front Facet (FF) detector. FIG. 7b shows the corresponding in-track signals A and B (from FIG. 6a, FIG. 6b and FIG. 6c) vs. time. Note that at the low recording power, which is below the marking threshold of the media, both front signal A and rear signal B behave in a similar fashion throughout the recording pulse. On the other hand, at a recording power that is above the marking threshold of the media, front signal A and rear signal B behave differently; they initially increase to a common level, but after the onset of mark formation the two signals diverge due to diffraction by the mark edge. Note that the sum of the front signal A and rear signal B increases slightly during the mark formation process. This is consistent with "burn-bright" optical media such as PC.

Proposed Figures of Merit

The essential feature of phase detected DRDW is to measure mark formation by comparing the light received in different portions of the return beam aperture. One simple way to accomplish this, using the signals defined above, is to define a figure of merit "F" as the difference of A and B, as shown in FIG. 6a.

Figure of Merit #1: F1=A−B

Figure 8A:
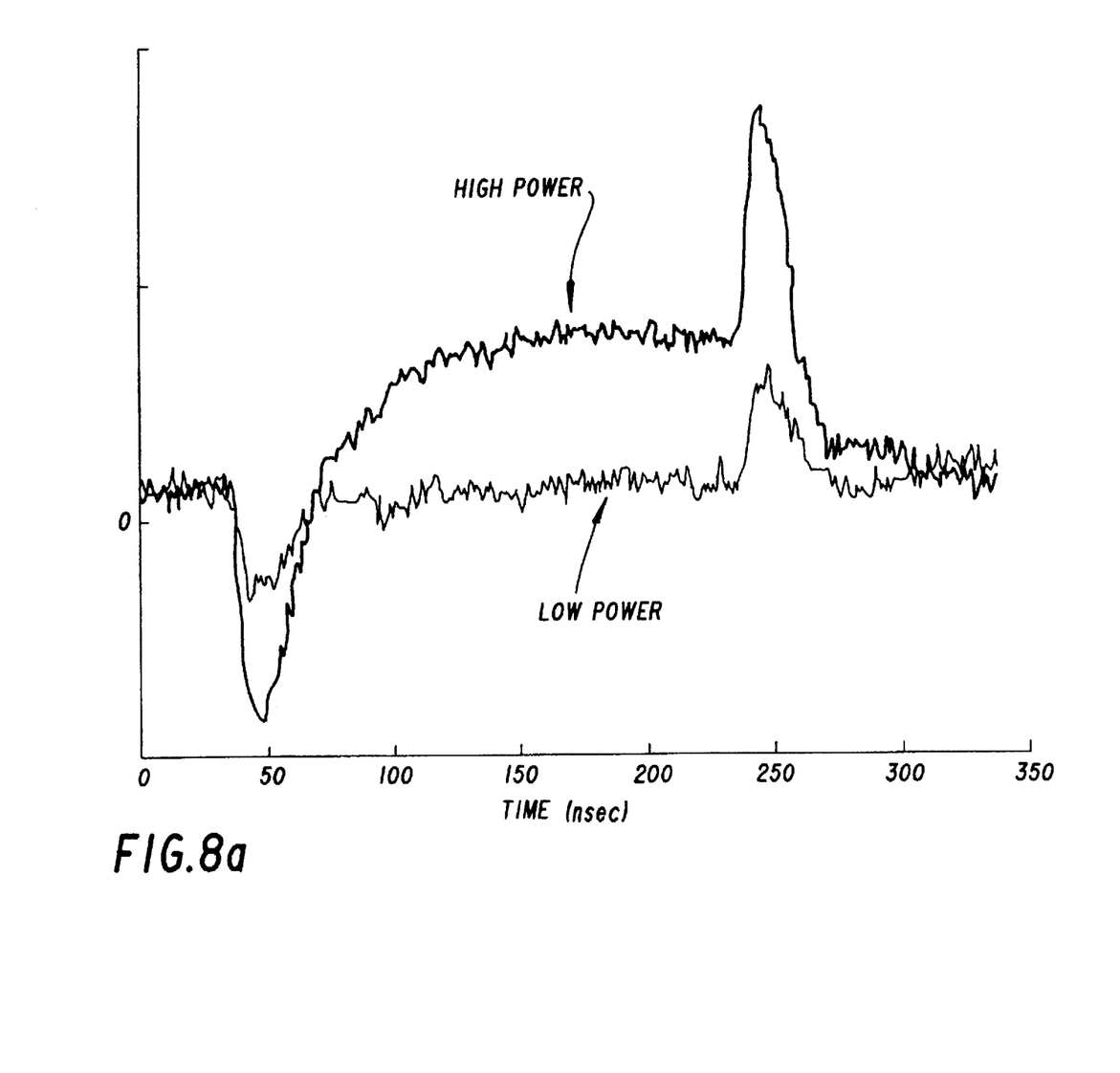
Figure 8B:
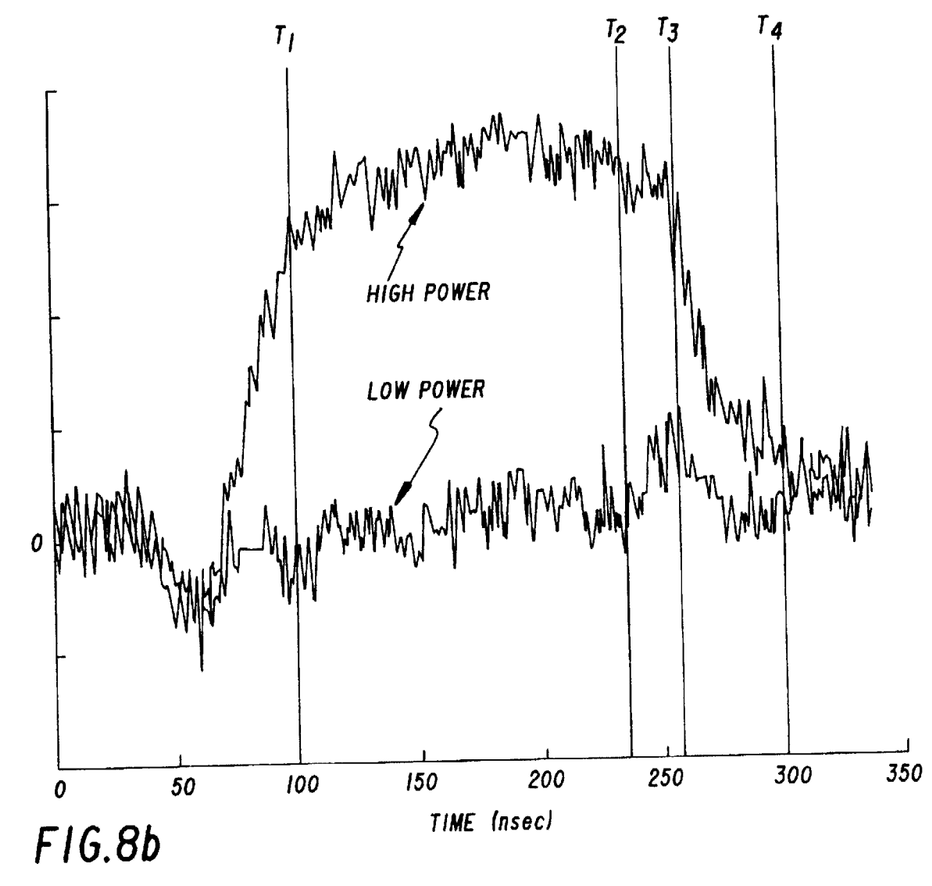
FIG. 8b illustrates the signals of FIG. 8a with the elimination of signal artifacts.

The difference signal has the advantage of canceling out both common mode signal and common mode noise. This can potentially increase the dynamic range and signal-to-noise ratio of the measurement. FIG. 8(a) shows the difference signal (A−B) for the two recording powers shown in FIG. 7a. Positive and negative peaks are observed in the difference signal at the beginning and end of the recording pulse. This phenomenon is primarily due to a time delay of about 3 nsec between the A and B signals and is caused by detector and processing electronics mismatch between the two channels. Inserting an additional 3 nsec delay into one of the signals prior to differencing eliminates most of this artifact, as shown in FIG. 8b. However, we should note that other electronic phenomena such as slew rate and bandwidth of the detectors or amplifiers will also cause a difference in rise and fall times between A and B paths. Such differences will distort the (A−B) signal most severely near the beginning and end of the recorded pulse. It is therefore important to define a figure of merit that is insensitive to the edges of the recording pulse. One such figure of merit might consist of averaging or integrating the difference signal over many recording pulses. Another figure of merit might consist of sampling the difference signal at specific times during the recording pulse, for example between T1 and T2 as indicated in FIG. 8b, or sampling the difference signal during the read power portion immediately following the write pulse, for example between T3 and T4 as indicated in FIG. 8b. Note that T1, T2, T3 and T4, or other sampling strategies, are determined according to media type and recording strategy.

Another simple figure of merit would be to take the ratio of A to B, as shown in FIG. 6b.

Figure of Merit #2: F2=A/B

Figure 9:
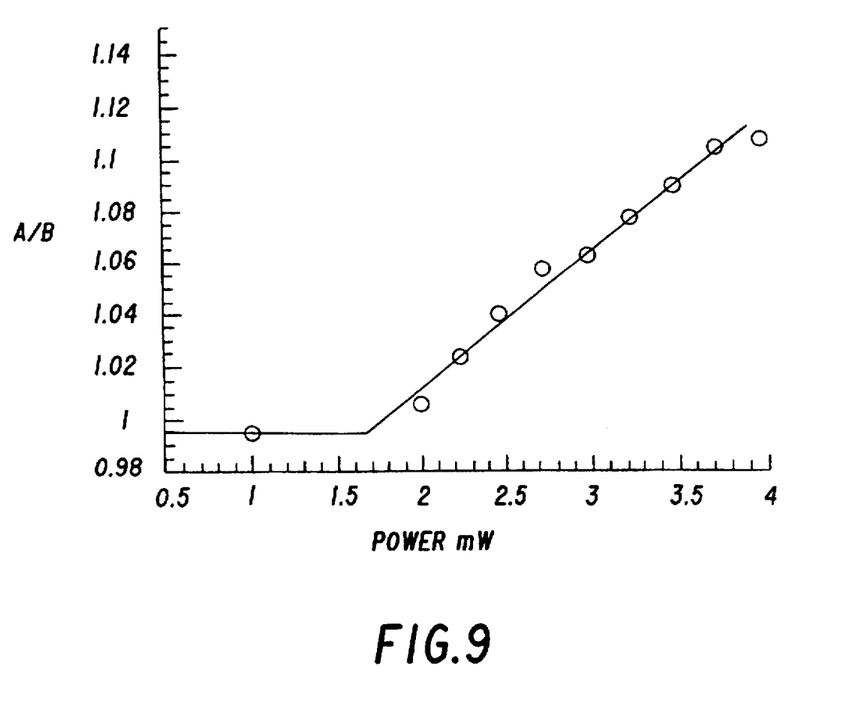
FIG. 9 is a graph of one of the proposed figures of merit as a function of recording power for phase change optical media.

This has the advantage of accurately measuring mark formation despite changes in laser power, media reflectivity, or recording sensitivity since it depends only on the ratio and not on the absolute values of signals A and B. This method is also sensitive to edge artifacts at the beginning and end of recording pulses, and thus the averaging or sampling strategies of Figure of merit #1 would apply here as well. FIG. 9 shows F2 as a function of recording power for PC media.

A third figure of merit, which combines some of the advantages of F1 and F2, is to divide the difference between A and B by the sum of A and B, as shown in FIG. 6c.

Figure of Merit #3: $F3=(A-B)/(A+B)=((A/B)-1)/((A/B)+1))$

As the above equation shows, F3 is simply a non-linear transformation of F2. As a result, it has the same immunity to changes in media reflectivity and record power sensitivity. In addition, the (A-B) term in the numerator subtracts out common mode signal just as it does for F1, increasing the dynamic range.

Numerous other figures of merit are possible using a detector configuration such as shown in FIG. 6a. For example, the "A+B" denominator of F3 could be replaced by simply "A". As a second example, the "A+B" denominator of F3 could be measured during a read period between write pulses, and multiplied by the ratio of write to read power. In another case, the "A/B" ratio of F2 could be divided (normalized) by a similar ratio measured during the read period between write pulses. This would improve detection accuracy when the record beam is partially obscured. In another example, signals A and B could be measured immediately following a write pulse. All these and other possible figures of merit share the common feature of comparing the reflected beam intensity at different parts of the aperture. For any figure of merit that includes normalization by a division operation, provisions should be made when the recording spot encounters an obscuration that drastically diminishes the amount of light reflected back to the detectors. Such provisions might include circuitry that limits the read or write current delivered to the laser.

Conclusion

We have explained the principle of measuring phase detected DRDW signals and discussed some of the potential advantages over prior art techniques. The existence of these signals was demonstrated with the "burn-bright" Kodak Phase Change media. Several possible figures of merit have been proposed for verifying proper mark formation and controlling the mark formation process. This discussion is also applicable to other optical recording materials, including "burn-dark" type media.

The invention has been described with reference to a preferred embodiment. However, it will be appreciated that variations and modifications can be effected by a person of ordinary skill in the art without departing from the scope of the invention.

Parts list 17 laser spot
21 forward detectors
22 rear detectors
24 lens
25 optical medium
26 lens
27 optics
28 lens
29 laser
41 adder
43 adding circuit
44 adder
45 subtractor circuit
48 divider circuit
49 divider circuit

We claim:

1. An optical recording system for recording data on an optical medium comprising:
   an optical source capable of providing at least one write pulse incident upon the optical medium;
   a direct read during write verification system within the optical source including a plurality of detectors, the detectors being configured to receive light that has been reflected from the optical medium into a return aperture, such that light from at least a front and a back of the aperture is detected by the detectors wherein there is at least one separate detector for each the front and the back;
   means for comparing the light incident on the separate detectors from the front and the back of the aperture.

2. The optical recording system of claim 1 wherein the means for comparing further comprises means for determining the difference between the front and the back.

3. The optical recording system of claim 1 wherein the means for comparing further comprises means for dividing the front by the back.

4. The optical recording system of claim 1 wherein the means for comparing further comprises means for obtaining both a sum and a difference of the front and the back and dividing the difference by the sum.

5. The optical recording system of claim 1 wherein the optical medium is a phase change optical medium.

6. The optical recording system of claim 1 further comprising within the direct read during write verification system obscuration detection means that determines when received light diminishes below a predetermined threshold.

7. The optical recording system of claim 6 wherein the means for comparing further comprises means responsive to received light being below the predetermined threshold.

8. The optical recording system of claim 1 wherein the means for comparing further comprises means for comparing during writing.

9. The optical recording system of claim 8 further comprising means responsive to the comparison means for adjusting the write pulse intensity in response to the result of the comparison between the front and the back.

10. A method of optically recording data on an optical medium comprising the steps of:
    providing an optical source capable of generating at least one write pulse incident upon the optical medium;
    providing a direct read during write (DRDW) verification system within the optical source including a capability of measuring light reflected from the optical medium into a return beam aperture, the DRDW verification system further comprising a plurality of detectors arranged such that at least a front and a back of the return beam aperture is detected by the detectors; and
    measuring mark formation by comparing light received in different portions of the return beam aperture.

11. The method of claim 10 further comprising providing means for comparing a sum of the signals from different portions of the return beam aperture to ascertain whether the sum is within a predetermined threshold.

12. The method of claim 11 further comprising providing means responsive to the means for comparing with a predetermined threshold for dynamically determining reflectivity of the optical medium.

13. The method of claim 12 wherein the means responsive further comprises means for comparing the predetermined threshold dynamically while recording.

14. An optical recording system for recording data on an optical medium comprising:
   an optical source capable of providing at least one write pulse incident upon the optical medium;
   a direct read during write verification (DRDW) system within the optical source having a capability of measuring light reflected from the optical medium into a return beam aperture, the DRDW system including a plurality of detectors configured to receive light from different portions of the return beam aperture; and
   a comparison circuit for comparing different portions of the return aperture, the comparison circuit further comprising a means for determining a relative relationship between a front portion and a back portion of the return beam.

15. The optical recording system of claim 14 wherein the comparison circuit further comprises a subtractor circuit for determining the difference between a front and a back of the return aperture.

16. The optical recording system of claim 14 wherein the comparison circuit further comprises a divider circuit for determining the ration between a front and a back of the return beam aperture.

17. The optical recording system of claim 14 wherein the means for comparing further comprises means for obtaining both a sum and a difference of a front and a back of the return beam aperture and dividing the difference by the sum.

18. The optical recording system of claim 14 further comprising means responsive to the comparison circuit for adjusting the write pulse in response to the result of the comparison between different portions of the return beam aperture.

19. The optical recording system of claim 18 wherein the means responsive further comprises means for dynamically controlling write pulse intensity.

* * * * *

(12) REEXAMINATION CERTIFICATE (4570th)
United States Patent
Eastman et al.

(10) Number: US 5,784,348 C1
(45) Certificate Issued: May 7, 2002

(54) PHASE DETECTED DIRECT READ DURING WRITE

(75) Inventors: Clarke E. Eastman, Rochester; Roger A. Hajjar; Edward C. Gage, both of Fairport; Steven C. Dohmeier, Rochester, all of NY (US)

(73) Assignee: Eastman Kodak Company, Rochester, NJ (US)

Reexamination Request:
No. 90/005,250, Mar. 15, 1999

Reexamination Certificate for:
Patent No.: 5,784,348
Issued: Jul. 21, 1998
Appl. No.: 08/666,172
Filed: Jun. 19, 1996

(51) Int. Cl.⁷ ............... G11B 5/09; G11B 7/00; G11B 11/03
(52) U.S. Cl. ............ 369/47.5; 369/53.33; 369/53.36
(58) Field of Search .................. 369/44.41, 44.42, 369/54, 120, 125, 116, 53, 59, 48

(56) References Cited

U.S. PATENT DOCUMENTS

| | | | |
|---|---|---|---|
| 4,621,352 A | 11/1986 | Kato | 369/54 |
| 4,648,085 A | * 3/1987 | Shimonou | 369/54 |
| 5,243,585 A | * 9/1993 | Hoshino et al. | 369/44.23 |

\* cited by examiner

*Primary Examiner*—Nabil Hindi (57) ABSTRACT

An optical recording system for recording data on an optical medium comprising: an optical source capable of providing at least one write pulse incident upon the optical medium; a direct read during write (DRDW) verification and control system within the optical source having a capability of measuring light reflected from the optical medium into a return beam aperture, the DRDW system including a plurality of detectors configured to receive light from different areas of the return aperture; and a comparison circuit for comparing light received in different portions of the return aperture.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–19 are cancelled.

* * * * *